A. C. PEARSON.
APPARATUS FOR TREATING FISH, &c.
APPLICATION FILED NOV. 9, 1907.

937,172.

Patented Oct. 19, 1909.
5 SHEETS—SHEET 1.

A. C. PEARSON.
APPARATUS FOR TREATING FISH, &c.
APPLICATION FILED NOV. 9, 1907.

937,172.

Patented Oct. 19, 1909.
5 SHEETS—SHEET 4.

Fig. 6.

Witnesses

Inventor
A. C. Pearson

Attorney

UNITED STATES PATENT OFFICE.

AUBER CRAWTE PEARSON, OF LEE, ENGLAND.

APPARATUS FOR TREATING FISH, &c.

937,172.                Specification of Letters Patent.    Patented Oct. 19, 1909.

Application filed November 9, 1907.  Serial No. 401,422.

To all whom it may concern:

Be it known that I, AUBER CRAWTE PEARSON, a subject of the King of Great Britain and Ireland, residing at Lee, in the county of Kent, England, have invented Improvements in Apparatus for Treating Fish, &c., of which the following is a specification.

This invention relates to apparatus for the treatment of fish, fish offal and the like (hereinafter referred to as fish) and has for its object to provide an improved construction and combination of parts by which the fish is cooked or digested by steam, drained, pressed and dried in a more or less continuous manner as hereinafter described and as is claimed in the appended claiming clauses.

The invention may be carried into effect in several ways some of which will now be described, by way of example, with reference to the accompanying drawings, whereof—

Figs. 8, 9, 10, 11 and 12 are detail views hereinafter referred to.

Figure 1:
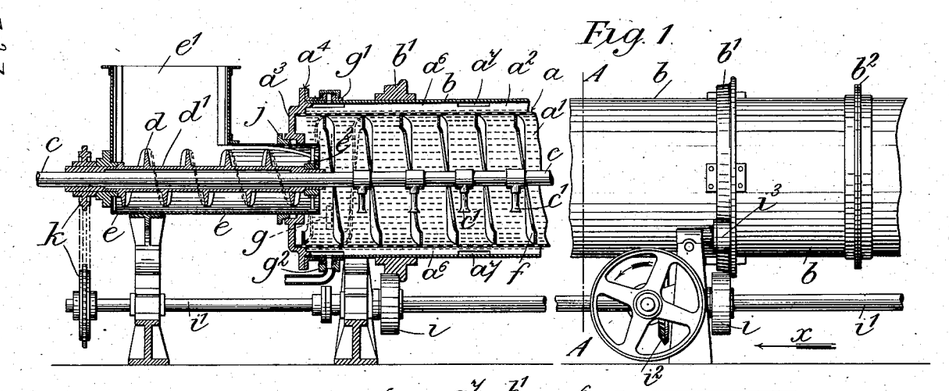
Figures 1 and 1$^a$ show in a side elevation mainly in section and with portions removed, one form of apparatus, Fig. 2 being a cross section of the same taken on the line A A of Fig. 1.
Figure 1A:
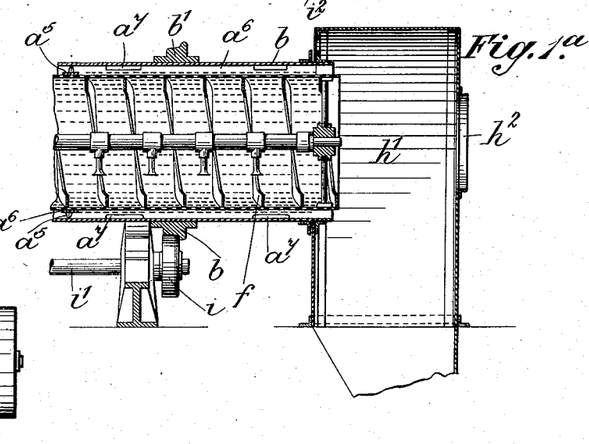
Figure 2:
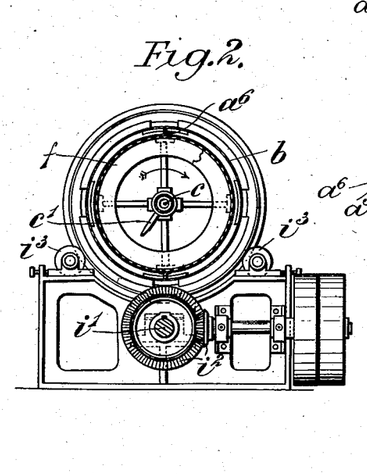

As shown in Figs. 1, 1$^a$ and 2, a cooking vessel in the form of a metal drum or tube $a$ (hereinafter called the perforated tube) is employed, which may be arranged with its axis slightly inclined to the horizontal, that is to say, downwardly in the direction of the arrow $x$, and provided with perforations $a^1$ communicating with a space $a^2$ between the outer surface of the said perforated tube $a$ and the inner surface of an outer inclosing drum or tube $b$. Disposed within the perforated tube $a$ and concentrically therewith, is a stationary steam supply pipe $c$ from which extend a plurality of branch pipes $c^1$ preferably inclined to the vertical as shown in Fig. 2, so that jets of steam can be caused to continuously impinge upon, break up and thoroughly cook and sterilize the material under treatment, which may conveniently be introduced into the tube $a$ by a worm conveyer $d^1$ in a stationary casing $e$ provided with a feed hopper $e^1$, the discharge outlet $e^2$ of the said casing being likewise concentric or co-axial with the perforated tube $a$. Secured within the perforated tube $a$ is a spiral conveyer or conveyer blade $f$ which extends to the inner circumferential wall thereof but provides an inner longitudinal passage. The arrangement is such that by rotating the inner and outer tubes $a$, $b$, the material introduced at the end adjacent to the feed hopper $e^1$ gradually proceeds to the other end by the action of the conveyer or conveyer blade $f$ and in so doing is subjected to the action of the steam jets issuing from the branch pipes $c^1$, the material being dragged around circumferentially for a certain distance, assisted or not by longitudinally arranged lifting blades or ribs (not shown) in the perforated tube $a$, and then slipping or falling so that new surfaces are being continually presented to the jets and an efficient penetration of the latter by the steam permitted. The outlet extremities of the branch pipes $c^1$ are conveniently splayed so that they are wider in the direction of the axis of the pipe $c$ than in a plane at right angles thereto, as shown. The steam used may advantageously be supplied to the pipe $c$ at a pressure of about forty pounds to the square inch, and be superheated.

With apparatus such as described, good results can be obtained by subjecting fish, fish offal and like material while being fed through the inner tube $a$, to the action of such superheated steam for about twenty minutes. The oil, condensed steam and other liquid constituents which escape through the perforations $a^1$ of the inner tube $a$ are discharged through openings $g$ in the outer tube $b$ into a convenient container through, it may be, an appropriate steam trap.

As the material passes through the tube $a$ it is gradually broken up by the action of the steam; for this reason the perforations in the inner tube $a$ may vary in size from the inlet end, where they may for instance be about one quarter of an inch in diameter, to the outlet end where they may be about one eighth of an inch in diameter.

Figures 4, 5, 8, 9, 10, 11:
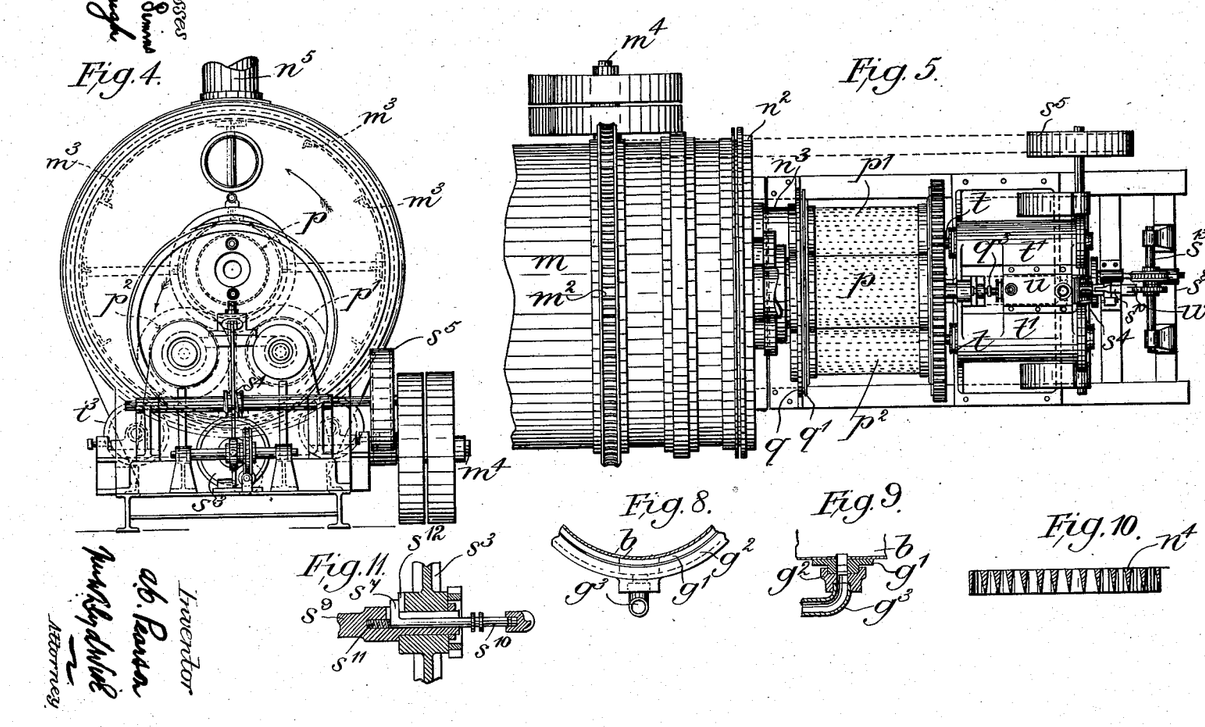

In order to prevent steam escaping from such of the openings $g$ as are, for the time being, out of register with the inlet to the steam trap, such openings $g$ are arranged to extend through a ring $g^1$ (Figs. 8 and 9)

fixed to the outer tube $b$ and adapted to revolve in a stationary ring or masking band $g^2$ which is provided with a hollow nipple $g^3$ for connection to the pipe of the steam trap. The residue from such a cooking element might be discharged directly into a pit, preferably through a chamber $h^1$, as shown, for subsequent treatment by any ordinary means or apparatus, in which case it will suffice to provide the exterior of the outer drum or tube $b$ with circular races or tracks $b^1$ by means of which it can be supported to revolve upon rollers $i$ carried for instance by a longitudinally arranged shaft $i^1$ driven by gearing, such as bevel wheels $i^2$, from a prime mover, frictional contact between the rollers and drum races being relied on to secure the requisite rotation of the drum, $i^3$ being guide rollers arranged to engage the races or tracks $b^1$ at opposite sides of the drum $b$.

In order to prevent the escape of vapors which may be generated in the drum $a$, a stuffing box $j$ may be fitted to or arranged at the end $a^3$ of the apparatus through which the outlet end $e^2$ of the stationary casing $e$ leading from the feed hopper $e^1$ extends. The opposite end of the outer drum or tube $b$ is arranged to extend in a more or less fluid tight manner through the front wall of the stationary chamber $h^1$. In this case, the chamber $h^1$ is provided with a normally closed inspection opening or manhole $h^2$. The worm conveyer $d$ in the casing $e$ of the feed hopper $e^1$ may conveniently be formed upon a sleeve $d^1$ which passes through a bearing or stuffing box carried by the casing $e$ and is driven by chain and sprocket gear $k$ or the like from the longitudinal driving shaft $i^1$. The steam supply pipe $c$, which is suitably fixed, can thus pass through the conveyer sleeve $d^1$ without affecting the operation of the conveyer $d$.

The perforated tube $a$ with the steam supply pipe $c$ and conveyer $f$ therein, is arranged to be readily withdrawn from the rotary outer drum or tube $b$ to admit of its being cleaned when necessary and afterward replaced. For this purpose it may conveniently be secured to the outer drum or tube $b$ at one end only, as by a flange or equivalent joint $a^4$. The inner tube $a$ may conveniently be made in lengths connected together by flanged joints $a^5$ by means of which and longitudinal angle bars $a^6$, each notched where necessary as at $a^7$ to allow of passage of oil, grease and other matter, it is maintained concentrically within the outer drum or tube $b$ which may also be made in lengths connected together by flanged joints $b^2$. The inner tube $a$ may conveniently be made in two semi-cylindrical portions that are readily detachable the one from the other to facilitate cleaning of the interior thereof. In this case the conveyer $f$ may be attached to one portion of the tube only. The feed hopper $e^1$ may be provided with a suitable slicing or equivalent dividing device and be made readily detachable from the remainder of the apparatus.

Figure 3:
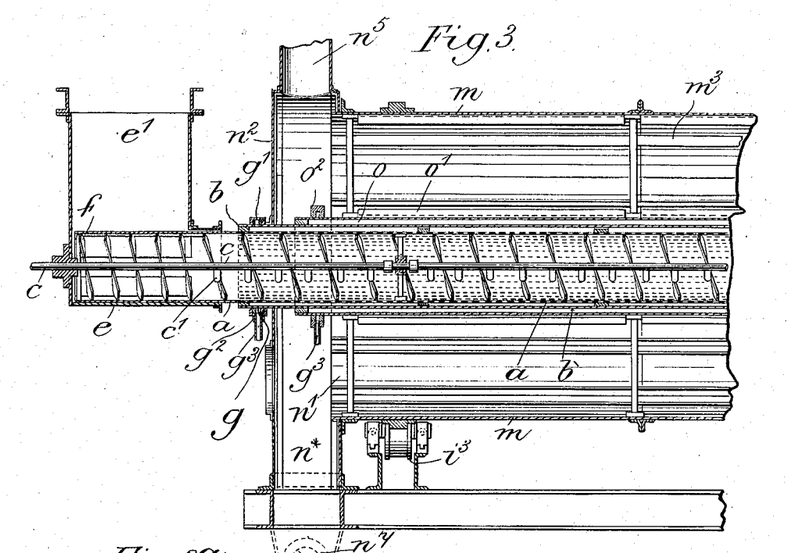
Figs. 3 and 3$^a$ show in longitudinal vertical section, Fig. 4 in end view, and Fig. 5 in part plan, a modification of the apparatus shown in Figs. 1 and 1$^a$.

As an object of the invention is to produce a compact machine occupying but little floor space, in lieu of discharging the residues into a pit, as hereinbefore described, to be further treated, it is preferred to transfer the cooked material, as hereinafter described, into an inclosing drum of considerably larger diameter constituting a drying chamber, the several drums forming a single structure adapted to be revolved in the same or a similar manner to that just above described, although it is preferred to drive the same positively. Such an arrangement is shown in Figs. 3 to 5 of the drawings, where the perforated drum $a$ and unperforated drum $b$ are inclosed by a drum $m$ adapted to be driven by a worm $m^1$ engaging an annular worm wheel $m^2$ upon the outer circumference of the drying chamber $m$. An inlet $n$ for hot air is provided at the end of the drying chamber remote from the end where the feeding of the material to the perforated tube $a$ takes place and is located preferably at the upper part thereof. The other end of the drum is open at $n^1$ for the escape of the dried material and hot air and vapor driven off from the material. The ends of the drying drum $m$ are mounted to rotate in stationary casings $n^2$ in one of which is the inlet $n$ and the other of which forms a chamber into which the dried material, air and vapor are discharged. If desired, the drum or tube $b$ which surrounds the perforated tube $a$ and, in some cases, may extend beyond the same, may be provided with a steam jacket $o$, or it may be a heating coil, to maintain the desired temperature. Steam is admitted to the steam jacket $o$ and water of condensation drawn therefrom, through stationary rings $o^1$ and $o^2$ respectively, surrounding perforated rings fixed to the jacket $o$. The drying chamber $m$ is also slightly inclined downwardly in the direction of the arrow $x$ and provided at its inner surface with longitudinally arranged bars or ribs $m^3$ or the like that are adapted to lift the material passing through the chamber and afterward allow it to fall in a known manner, $o^3$ representing one of a plurality of similar ribs external to the jacket $o$ for catching and carrying around the material falling from the bars $m^3$. The chamber $m$, rotary outer drum or tube $b$ and perforated tube $a$ are suitably connected together, as shown, to revolve as one piece. The outlets $g$ for draining liquids from the drum or tube $b$ are intended to co-act with a stationary masking device $g^2$ as hereinbefore described with reference to Fig. 1.

As it is an important step in the process of treating the material, that it should be pressed before being dried, to remove as much oil, water and other liquid constituents as possible, means are provided for this purpose, which may, for example, comprise three perforated or openwork cylinders $p$, $p^1$, $p^2$ (Figs. 3, 4 and 5) arranged horizontally so that the ends of their axes occupy positions corresponding to the apices of an equilateral triangle in an appropriate frame. The normal position of the said cylinders $p$, $p^1$, $p^2$, which are open ended toward the apparatus, is such that one, viz. $p$, is in alinement with the perforated tube $a$, another, viz. $p^1$, in alinement with the material inlet $n^3$ to the drying chamber, and the third, viz. $p^2$, in alinement with a stationary resistance plate or abutment $q$. The inlet $n^3$ may be provided with a grid $n^4$ (Fig. 10) the outer edges of the bars of which are formed as knife edges to cut up the material forced past them. The cylinders $p$, $p^1$, $p^2$ are fixed in a frame $q^1$ that is mounted to rotate in the resistance plate $q$ and a stationary frame $q^2$, and is kept in close contact with the resistance plate $q$, as by a screw $q^3$.

The frame $q^1$ is adapted to be revolved as hereinafter described, so that assuming the apparatus to have been started and in normal working condition, the cylinder $p$ which is in alinement with the perforated tube $a$ and which is fitted with a movable end plate or follower $r$, will gradually become filled with material, forcing the follower $r$ in front of it until the same is stopped at the outer end of the cylinder. To facilitate the movement of the follower $r$, it may be mounted to slide on guide rods $r^1$. The frame $q^1$ is then turned through an angle of 120° to cause the cylinder $p$ to register with the stationary resistance plate or abutment $q$ against which the material is adapted to be pressed by the follower $r$, and thereafter turned through a further angle of 120° causing the cylinder $p$ to come into alinement with the inlet $n^3$ to the drying chamber $m$ so that the contents can be forced therein by the follower $r$, and so on. To effect the desired intermittent rotation of the frame $q^1$ the latter has fixed to it a spur wheel $s^1$ with which engages a pinion $s^2$ adapted to be rotated through a worm wheel $s^3$ and worm $s^4$ driven from the main driving shaft $m^4$, through belt and pulley gear $s^5$ and a shaft $s^6$, a clutch $s^7$ (Fig. 11) being provided, operated by a cam $s^8$, by which means the worm wheel $s^3$ may be thrown into and out of gear.

The worm wheel $s^3$ is mounted loose upon a hollow spindle $s^9$ carrying the pinion $s^2$ and is adapted to be connected to such spindle $s^9$ by the clutch $s^7$ which comprises a transverse key which projects through a lateral slot in the spindle $s^9$ and is connected to an endwise movable spindle $s^{10}$ which extends into the hollow shaft $s^9$ and is arranged to be acted upon by the cam $s^8$. The spindle $s^{10}$ is arranged to be pressed outward by a spring $s^{11}$ for causing the clutch key $s^7$ to enter a notch or recess $s^{12}$ in the adjacent end of the boss of the worm wheel $s^3$ and so connect such wheel to the spindle $s^9$, and to be pressed inward, against the action of the spring, by the cam $s^8$ for disengaging the clutch key $s^7$ from the worm wheel $s^3$ and allowing the latter to run loose. The cam $s^8$ is fixed to a driving shaft $s^{13}$ which is constantly driven by worm and spur gearing $s^{14}$ and $s^{15}$ from the worm wheel $s^3$.

Each cylinder $p$, $p^1$, $p^2$ of the frame $q^1$ is fitted with an end plate or follower $r$ which is free to slide therein on guides as described, and which can be acted upon by the power devices for effecting compression and removal of the contents, as previously referred to. Conveniently, the power devices may comprise a pair of steam or hydraulic rams or pistons and rods $t$ located so as to operate simultaneously upon the end plates or followers $r$ of the two cylinders $p^1$, $p^2$ which are not in alinement with the perforated tube $s$ so that while the material in one cylinder $p^2$ is being compressed, that in the other $p^1$, which has been previously compressed, is forced into the drying chamber $m$, the frame revolving gear being meanwhile inactive. While this has been occurring the cylinder $p$ has been gradually filling so that as soon as the piston rods $t$ are withdrawn, the gear is thrown into operation automatically by the cam $s^8$ and the frame $q^1$ partially revolved as described, causing the now full cylinder $p$ to take the place of the one $p^2$ in which the material has just previously been compressed and to advance the latter into the position previously occupied by the cylinder $p^1$ from which the contents were discharged. The empty cylinder $p^1$ will then become gradually filled again, the sliding end plate or follower $r$ being forced back to its initial position by the advancing material.

Figures 3A, 12:
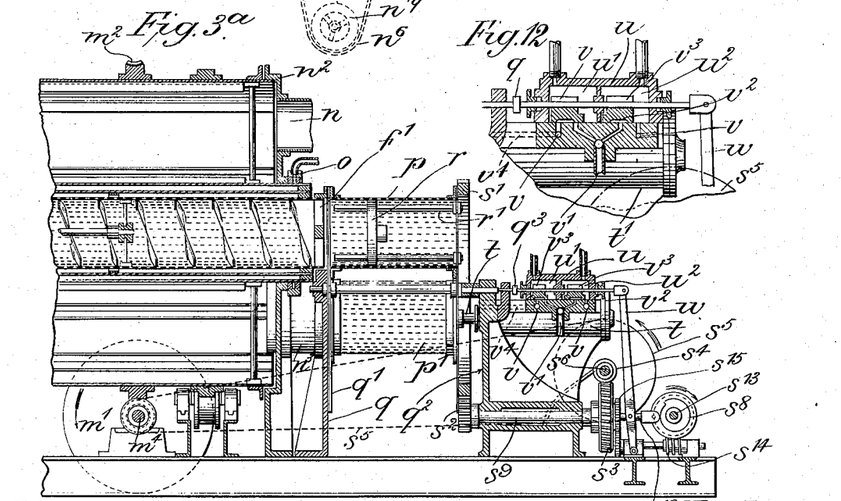

The supply of motive fluid, for instance steam, to the ram or like cylinders $t^1$ may be controlled by the cam $s^8$, there being employed, for example, a divided steam chest $u$, shown more particularly in Fig. 12, one compartment $u^1$ of which is in communication with a low pressure steam source and the other $u^2$ with a high pressure source regulated to suit the material under treatment, the former being for supplying steam to the cylinders $t^1$ for withdrawing the rams or pistons and rods $t$ from the perforated or openwork cylinders $p$, $p^1$, $p^2$, and the latter for advancing the same into the said cylinders. Suitable inlet and exhaust ports $v$, $v^1$ respectively are provided in the said valve chest $u$, and cavities $v^2$ in duplicated slide valves $v^3$, which, in conjunction with ports or passages $v^4$ leading to the opposite ends of the steam cylinders $t^1$, serve to effect the required control. In the drawings, the valve $v^3$ in the compartment $u^1$ of the valve chest is shown as placing the port $v$ connected to the corresponding end of the cylinders $t^1$ in communication with the exhaust port $v^1$, while the valve $v^3$ in the compartment $u^2$ is covering the exhaust port $v^1$ and admitting steam to the other end of the said cylinders. The valves $v^3$ may, as shown, be moved by means of a pivoted arm or lever $w$ which is connected with the movable member $s^{10}$ of the clutch $s^7$ provided for the cylinder frame gear.

The cam $s^8$ is so constructed and arranged, as shown, that the turning movement of the frame $q^1$ and attached parts will be effected quickly and so as to allow of a comparatively long dwell, and the valve mechanism is such that the rams or equivalent will commence to act gradually upon the end plates or followers $r$ of the cylinders $p^1$, $p^2$ in the second and third positions, immediately after the cylinders have assumed these positions, and, after completing their forward strokes, will be returned quickly. The material in the perforated tube $a$ is discharged therefrom by the action of the conveyer $f$ therein but it is preferred to employ a terminal worm conveyer or screw $f^1$ (Fig. 3) of fine pitch to facilitate the discharge. The cylinder frame $q^1$ may be mounted to rotate in a casing (not shown) into which the liquid, squeezed from the material when the cylinder containing it is in the second position, falls and from which it can be discharged through a suitable pipe or passage. In the example shown in Fig. 3, the conveyer $f$ is extended into the feed hopper where its pitch is reduced in order to obtain the desired rate of feed of the material being treated.

The casing $n^2$ in which the front end of the drying drum $m$ rotates and which is provided at the bottom with the outlet $n^*$ for the dried material fed into the same from the said drum, is provided also with an air and vapor outlet $n^5$ at the top. The bottom outlet $n^*$ may discharge into any desired receptacle, it may be a pit or trough $n^6$ provided with a conveyer $n^7$.

Figure 6:
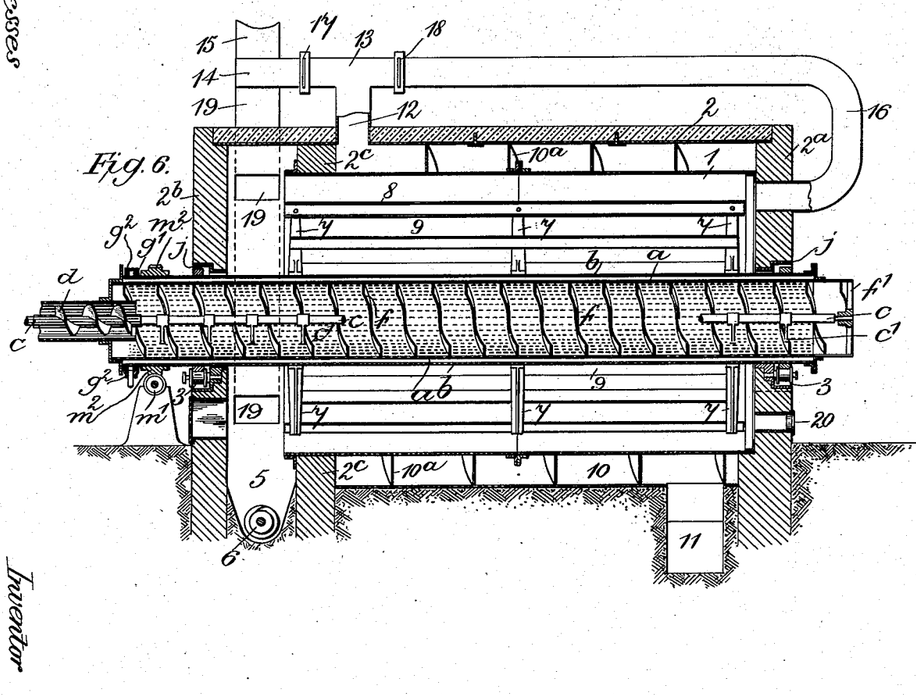
Figs. 6 and 7 show respectively in longitudinal section and cross section, a modified construction.
Figure 7:
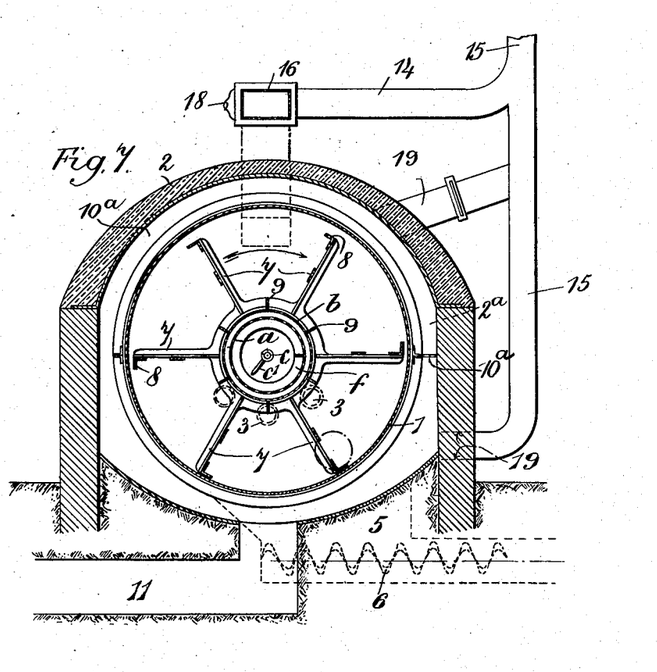

In some cases, the drying chamber $m$ may be stationary and the rotary outer drum or tube $b$ surrounding the perforated tube $a$ be provided externally with means such as a screw or like conveying device adapted to move the material through the drying chamber and, it may be, to intermittently lift the material during its passage and allow it to fall on the said rotary drum $b$, suitable bearings being provided for carrying the rotary outer drum or tube $b$ and attached parts. Figs. 6 and 7 show an arrangement of this kind wherein the rotary inner and outer tubes $a$ and $b$ are surrounded by a stationary cylindrical drying chamber 1 inclosed within a stationary casing 2 through the end walls $2^a$, $2^b$ of which the said tubes extend. The tubes are carried by antifriction rollers 3 supported by the said end walls of the casing 2 and are rotated by the worm gearing $m^1$, $m^2$. The drying chamber 1 bears at one end against the adjacent wall $2^a$ of the casing 2, its other end, which is carried by an intermediate wall $2^c$, being open and arranged to discharge into a receptacle 5 located at the bottom of the corresponding end of the casing and provided with a screw conveyer 6. The outer tube $b$ has fixed to it a number of radial arms 7 carrying longitudinal bars 8 of L-section forming paddles adapted to intermittently lift up and agitate the material fed into the chamber through an opening in the end wall $2^a$ of the casing 2, it may be by mechanism of the kind hereinbefore described and shown in Figs. 3, $3^a$, 4 and 5, and move the same toward the open end of the chamber and into the receptacle 5. The tube $b$ may also be provided externally with longitudinal ribs 9 adapted to catch material dropped on the tube by the rotating bars 8 and carry it partly around the tube. For heating the chamber 1, hot gases are led into the annular space 10 formed by and between the chamber 1, casing 2 and the end and intermediate walls $2^a$ and $2^c$ of the latter, from a lower flue 11, the hot gases being caused to circulate around the chamber 10, preferably in a spiral path by the aid of a spiral partition $10^a$, and to escape through an upper outlet 12 into a pipe 13. This pipe is connected by a pipe 14 to a chimney or uptake 15 and, by a pipe 16, extending through the end wall $2^a$ of the drying chamber 1, dampers 17 and 18 being provided for controlling these connections so that the whole of the hot gases can be passed through the pipe 16 into the chamber 1, or through the pipe 14 direct into the chimney 15, or part can be caused to pass one way and part the other way. The casing 2 is provided with outlet pipes 19 for enabling the hot air admitted to the drying chamber 1, and the gases and vapors evolved from the material under treatment therein, to pass to the chimney 15. 20 is a normally closed passage through which air can, when desired, be caused to enter the drying chamber 1.

The details of construction may be variously modified. For instance, in the apparatus shown in Figs. 3, $3^a$, 4 and 5, screws with connections operated in any known or appropriate way may be used in lieu of cylinders and rams or pistons for compressing the material in the cylinders $p$, $p^1$ and $p^2$ and for forcing it therefrom. Similarly, the position of the inlet to the drying chamber $m$ and of the stationary resistance plate or abutment $q$, may be altered with respect to the outlet from the perforated tube $a$ from what is shown in the drawings without affecting the action of the plant. As before stated, it is preferred to superheat the steam employed for the cooking operation as the water of condensation will thereby be less and the extracted constituent accordingly more concentrated.

In the employment of the apparatus for treating fish refuse, it will be found that the oil, together with moisture containing gelatinous and other matter, will be effectually washed out of the fish refuse, producing a resultant liquor which, after separation of the oil in any known or suitable manner, can, if desired, be treated for the recovery of glue and other substances therefrom in any known or suitable manner.

What I claim is:—

1. In combination, a perforated and revoluble cooking drum mounted to rotate about a longitudinally extending axis and a stationary steam supply pipe surrounded by said drum and having jet branches extending laterally downward toward the lower inner surface of the drum, so that the said surface is movable with respect to jets of steam issuing from said branches.

2. In combination, a perforated cooking drum mounted to rotate about a substantially horizontal axis, a worm conveyer on the inner cylindrical surface of such drum, and a stationary steam supply pipe having jet branches depending into the lower semi-cylindrical portion of said drum.

3. In combination, a perforated cooking drum mounted to rotate about a substantially horizontal axis, a worm conveyer secured within the drum throughout its entire length, and a stationary steam supply pipe with jet branches extending within a portion of such drum.

4. In combination, a perforated and revoluble cooking drum mounted to rotate about a substantially horizontal axis, a steam supply pipe located within said drum, jet branches depending into the lower semi-cylindrical portion of the drum, an unperforated drum surrounding the perforated drum, and means for continuously drawing liquid from the unperforated drum.

5. In combination, a perforated and revoluble cooking drum, a steam supply pipe located in said drum, an unperforated drum surrounding the perforated drum and revolving therewith, annularly arranged liquid outlets in the unperforated drum, and a hollow stationary band for masking said outlets and connected to a discharge pipe.

6. In combination, a perforated and revoluble cooking drum, a steam supply pipe located in said drum, an unperforated drum surrounding the perforated drum and arranged to rotate therewith, a feed hopper casing in fluid tight communication with the inlet of the perforated drum, and a support through which the discharge ends of the perforated and unperforated drums pass.

7. In combination, a perforated and revoluble cooking drum, a steam supply pipe located in said drum, an unperforated drum surrounding the perforated drum and arranged to rotate therewith, and a heating jacket surrounding the unperforated drum.

8. In combination, a perforated and revoluble cooking drum, a steam pipe located in said drum, an unperforated drum surrounding the perforated drum and arranged to rotate therewith, a steam jacket surrounding and fixed to the unperforated drum, annularly arranged openings in opposite ends of the jacket and stationary rings in communication with steam supply and exhaust pipes and arranged to mask such of the openings as do not momentarily register with the inlet and exhaust pipes.

9. In combination, a cooking element comprising concentrically arranged perforated and unperforated drums arranged to revolve in unison, a steam supply pipe within the perforated drum, and a chamber for drying the cooked material, surrounding said cooking element.

10. In combination, a cooking element comprising concentrically arranged perforated and unperforated drums arranged to revolve in unison, a steam supply pipe within the perforated inner drum, and a surrounding chamber into which the material, after cooking, is discharged and caused to travel in a direction opposite to the direction followed in its passage through the cooking element.

11. In combination, a cooking element comprising concentrically arranged perforated and unperforated drums arranged to revolve in unison, a steam supply pipe within the perforated inner drum, a drying chamber surrounding said cooking element, means for heating the same, and means for automatically collecting the cooked material and transferring the same to the drying chamber.

12. In combination, a cooking element comprising a perforated drum arranged substantially horizontally, means for feeding material into said drum, means for simultaneously agitating said material within the drum and moving it forward therein, a stationary steam supply pipe extending along and within said drum and having outlets through which steam can issue in a downward direction upon the material passing through said drum, and means for collecting liquid passing through the perforations in said drum.

13. In combination, a cooking element comprising a perforated drum arranged substantially horizontally, means for feeding material into said drum, means for simultaneously agitating said material within the drum and moving it forward therein, a stationary steam supply pipe extending along and within said drum and having outlets through which steam can issue in a downward direction upon the material passing through said drum, and a drum or casing surrounding said perforated drum and adapted to collect and drain away liquid passing through the perforations therein.

14. In combination, a cooking element comprising concentrically arranged perforated and unperforated drums arranged to rotate together, a steam supply pipe within the perforated inner drum, and a drying chamber surrounding and revolving with the perforated and unperforated drums.

15. In combination, a cooking element comprising concentrically arranged perforated and unperforated drums, a steam supply pipe within the perforated inner drum, means for agitating material within and feeding it through the inner perforated drum, and a surrounding chamber into which the material, after being cooked, is discharged and caused to travel in a direction opposite to the direction followed in its passage through the cooking element.

16. In combination, a cooking element comprising concentrically arranged perforated and unperforated drums mounted to rotate together, a steam supply pipe within the perforated inner drum and a surrounding rotary chamber into which the material, after being cooked is discharged and caused to travel in a direction opposite to the direction followed in its passage through the cooking element.

17. In combination, a cooking element comprising concentrically arranged perforated and unperforated drums mounted to rotate together and a steam supply pipe within the perforated inner drum, and a drying chamber surrounding said cooking element and mounted to rotate therewith, means for heating the chamber, and means for automatically collecting the cooked material from the cooking element and transferring it to the drying chamber.

18. In combination, a cooking element, a drying chamber surrounding such element, means for revolving the cooking element and drying chamber in unison and means within the drying chamber for agitating material introduced therein.

19. In combination, a cooking element, comprising concentrically arranged perforated and unperforated drums mounted to rotate in unison, a cylindrical drying chamber surrounding and connected to said drums, and end supports to which the drums and drying chamber are connected by substantially fluid tight joints.

20. In combination, a cooking element, comprising concentrically arranged perforated and unperforated drums mounted to rotate in unison, a cylindrical drying chamber surrounding and connected to said drums, an end support for the drums and drying chamber having a material inlet adjacent to the outlet of the cooking element, an end support having a material outlet, means for connecting the drums and drying chamber to such supports in a substantially fluid tight manner, and means for receiving material from the cooking element and transferring it to the drying chamber.

21. In combination, a cooking element, a fixed abutment, a cylinder for receiving the cooked material, a follower in such cylinder adapted to be displaced by the entering material, means for moving the cylinder successively in front of and past the fixed abutment, and means for advancing the follower to a limited extent to press the material against the fixed abutment and to further advance and eject the material after the cylinder passes the fixed abutment.

22. In combination, a cooking element, a fixed abutment, a cylinder for receiving the cooked material, means for moving said cylinder in a direction at right angles to its axis, said cylinder being fitted with a follower adapted to be displaced in one direction by the entering material, means for advancing said follower in the opposite direction to a limited extent to press the material against the fixed abutment after a partial movement of the cylinder, and for further advancing said follower to eject the material after a further partial movement of the cylinder.

23. In combination, a cooking element, a drying chamber surrounding such element and having an inlet in its end adjacent to the outlet of the cooking element, a movable cylinder-carrying frame and a set of cylinders therein, each cylinder being provided with a follower, a fixed abutment, said inlet and abutment being both in the path of movement of the cylinders, means for intermittently moving the cylinder carrying frame and successively bringing an empty cylinder to the outlet of the cooking element, a full cylinder from such outlet to the fixed abutment to enable the material therein to be compressed, and a cylinder in which the material has been pressed to the inlet of the drying chamber, and means for moving the follower in each cylinder in a direction to compress the material in the cylinder and eject it therefrom.

24. In combination, a cooking element, a drying chamber surrounding such element, and having an inlet thereto, a fixed abutment, a revolving cylinder carrying frame having its axis eccentric to the axis of the cooking element, cylinders mounted in said carrying frame, and having the axes coinciding with the apices of an equilateral triangle successively passing the center of the cooking element, followers in said cylinders, said drying chamber inlet and fixed abutment being both in the path of the axes of the cylinders, power operated means for intermittently rotating such frame and cylinders, and means for simultaneously compressing material in a filled cylinder against the fixed abutment and for ejecting the previously pressed material from another cylinder into the drying chamber while the remaining cylinder is being filled from the cooking element.

Signed at 27 Poultry in the city of London, England this sixteenth day of October 1907.

AUBER CRAWTE PEARSON.

Witnesses:
F. P. LEE,
R. A. BROWN.